(12) United States Patent
Franz et al.

(10) Patent No.: US 7,564,807 B2
(45) Date of Patent: Jul. 21, 2009

(54) METHOD FOR CONTROLLING RECORDED ANNOUNCEMENT AND INTERACTIVE VOICE RESPONSES IN PACKET NETWORKS

(75) Inventors: Mathias Franz, Berlin (DE); Alfred Jugel, Geretsried (DE); Patrick Kleiner, Munich (DE); Norbert Loebig, Darmstadt (DE); Klaus Pulverer, Munich (DE)

(73) Assignee: Nokia Siemens Networks GmbH & Co. KG, Munich (DE)

( * ) Notice: Subject to any disclaimer, the term of this patent is extended or adjusted under 35 U.S.C. 154(b) by 1211 days.

(21) Appl. No.: 10/221,144

(22) PCT Filed: Sep. 14, 2001

(86) PCT No.: PCT/DE01/03544

§ 371 (c)(1),
(2), (4) Date: Jan. 24, 2003

(87) PCT Pub. No.: WO02/25958

PCT Pub. Date: Mar. 28, 2002

(65) Prior Publication Data

US 2003/0198194 A1     Oct. 23, 2003

(30) Foreign Application Priority Data

Sep. 22, 2000  (DE) .................... 100 47 129

(51) Int. Cl.
*H04L 12/16* (2006.01)
(52) U.S. Cl. .................... 370/260; 370/352
(58) Field of Classification Search ........ 370/235, 370/252, 352, 260, 237
See application file for complete search history.

(56) References Cited

U.S. PATENT DOCUMENTS

| | | | | |
|---|---|---|---|---|
| 5,600,639 | A | * | 2/1997 | Kreten et al. ............... 370/259 |
| 6,014,437 | A | | 1/2000 | Acker et al. |
| 6,104,803 | A | * | 8/2000 | Weser et al. .................. 379/230 |
| 6,128,305 | A | * | 10/2000 | Hjalmtysson et al. ........ 370/410 |
| 2003/0190033 | A1 | * | 10/2003 | Lantermann ................. 379/242 |

FOREIGN PATENT DOCUMENTS

| | | |
|---|---|---|
| EP | 0 282 187 | 9/1988 |
| EP | 0 282 197 | 9/1988 |
| EP | 1 104 205 | 5/2001 |
| WO | WO 99/29095 | 6/1999 |

OTHER PUBLICATIONS

"VoxPortal, A member of the SURPASS Application Family" Siemens AG 1999, Information and Communication Networks.

* cited by examiner

*Primary Examiner*—Jayanti K Patel
*Assistant Examiner*—Dargaye H Churnet
(74) *Attorney, Agent, or Firm*—Dickinson Wright PLLC

(57) ABSTRACT

The invention relates to a method for controlling recorded announcements and interactive voice responses for calls made outside an exchange, using a packet network (PN), by means of peripheral equipment (LTG) of a switching system, which does not provide any HW-oriented tasks for its interface system controlled by switching technology, whereby peripheral equipment (LTG) with virtual ports is defined. The method is characterised in that resources for the recorded announcement and interactive voice response function are provided by an external device, that the peripheral equipment is provided with virtual recorded announcement and interactive voice response ports, that an interface exists between the peripheral equipment and the external device and that the external resources can be used in relation to a specific port by the switching system.

14 Claims, 5 Drawing Sheets

METHOD FOR CONTROLLING RECORDED ANNOUNCEMENT AND INTERACTIVE VOICE RESPONSES IN PACKET NETWORKS

CLAIM FOR PRIORITY

This application claims priority to International Application No. PCT/DE01/03544 which was published in the German language on Sep. 14, 2001.

TECHNICAL FIELD OF THE INVENTION

The invention relates to a method for controlling announcements and dialog in packet networks.

BACKGROUND OF THE INVENTION

Conventionally, in the state of the art, a switching node has peripheral devices (connection devices for subscribers or lines), a central computer platform, a message distribution device, and other central units (coupling field, protocol termination devices (e.g., #7), background memory and operating devices). These relationships are shown in FIG. 1.

For reasons of fail-safe reliability, the central components of a switching system are designed to be redundant (i.e., doubled), while the peripheral devices are generally not structured to be redundant. In the case of increased failure requirements (e.g., rescuing stable connections beyond the failure of a peripheral device), however, the latter can demonstrate redundancy.

If signaling and voice are carried in a disassociated manner, on separate paths, and if the only task left to the peripheral devices is that of protocol processing and/or conversion without any physical termination of the voice channels, the restrictions of the peripheral devices with regard to the resource pool and the number of terminable voice channels are eliminated. The peripheral device is determined for this use, with regard to its capacity, by the performance capacity of the processors, the size of the memory and the capacity of the message interface.

Since more than one direction must be made available for connecting voice between the A subscriber and any B subscriber, two different peripheral devices PE are generally involved in establishing and ending the connection (FIG. 2).

A conventional peripheral device terminates the connection lines for which it has the responsibility of handling the switching technology processing. Usually, there are peripheral devices for terminating n PCM segments (e.g., n=4 PCM30 segments for 120 connection lines). In the present use, in which voice is transmitted outside the peripheral device, the restriction concerning the physically determined maximum number of terminable connection lines is eliminated. For this use, a peripheral device can process more than 120 connections at the same time, for example. These relationships are described in the European patent application EP 99123208.3. According to this application, such a peripheral device can run several times virtually on a real peripheral device, thereby creating the functionality of the connection control of n times 120 connections on a real peripheral device, for example. A network scenario in which switching centers are used for connections carried outside the switching center is shown in FIG. 3.

The switching center that acts to control connections made outside the switching center can make known subscriber or network features available to the A and/or B side subscriber of conventional TDM networks. This includes, in particular, announcements and dialogs that become necessary in certain situations (e.g., "this number is not in use," "the number has changed: the new number is 722-25940" or an inquiry concerning authorization to dial into a packet network). In a conventional case, in which the working channel of the connection is passed into the switching center, these announcements and dialogs can be provided by peripheral devices equipped with the appropriate functionality.

However, if the working data is transmitted in a packet network outside the switching center, preferably an external system is used for this purpose. This system possesses interfaces to the packet network for the working data consisting of announcements and user input. Furthermore, the external announcement and dialog system (hereinafter referred to as the "IVR system" or "Interactive Voice Response system") possess a logical control interface to the switching center that acts to control connections in the packet network transmitted outside the switching center.

The set of problems resulting from this is how to achieve control of an external system providing announcements and dialogs in a switching center that acts to control connections in the packet network transmitted outside the switching center. For this purpose, the announcement and dialog functions known from conventional switching centers are supposed to be available for connections carried by way of a packet network (i.e., standard announcements, announcements with variable content, dialogs with DTMF input or voice input of the end subscriber). Furthermore, it is supposed to be possible to use the connection control logic (Call Control) available in a conventional switching center to control the announcement and dialog function. Further, it should be passible to transmit working data freighted with announcements and subscriber input in the packet network, without the working data freighted with announcements and subscriber input being transmitted to the switching center responsible for control of connections carried outside the switching center.

Likewise, unnecessary conversion of the working data stream freighted with announcements and subscriber input to the TDM technology should also be avoided, such as the TDM connection technology in the peripheral units of the switching center active for connections carried outside the switching center. In the end, the availability of features and services of a conventional switching center, which require announcement and dialog functions, must be assured for the switching center for control of connections carried within the packet network, with little development effort or expense.

Conventionally, to solve these problems, announcements and dialogs are made available in the packet network by means of external systems. For this purpose, the announcements and dialogs are to be made available either at the network transition between the packet network and the TDM network or by means of packet-based IVR systems specifically designed for announcement and dialog functions. In this connection, control of the announcement and dialog function takes place by means of the call control server that controls the connection.

The advantage here is the general usability in packet networks, as well as the fact that no superfluous TDM equipment has to be provided and no required additional conversion of working data has to occur.

However, there is insufficient controllability/usability of the IVR function present in the packet network by means of a switching center active for connections carried in the packet network.

SUMMARY OF THE INVENTION

The invention discloses a method of how announcements and dialogs can be made available to a switching center active for connections carried in the packet network.

In one embodiment of the invention, peripheral devices for IVR functions are provided with virtual announcement and dialog ports. In this way, application of the principle of the virtual peripheral device for making IVR ports available outside the switching center can take place, resulting in the advantage of little development expense or effort, as well as low hardware costs. The external announcement and dialog ports are packet-based and are modeled as ports at a media gateway, with IVR-specific signaling being transmitted by way of the signaling protocol used for access to the media gateway.

BRIEF DESCRIPTION OF THE DRAWINGS

The invention is explained in greater detail below, on the basis of exemplary embodiments shown in the drawings, in which.

DETAILED DESCRIPTION OF THE INVENTION

Figure 1:
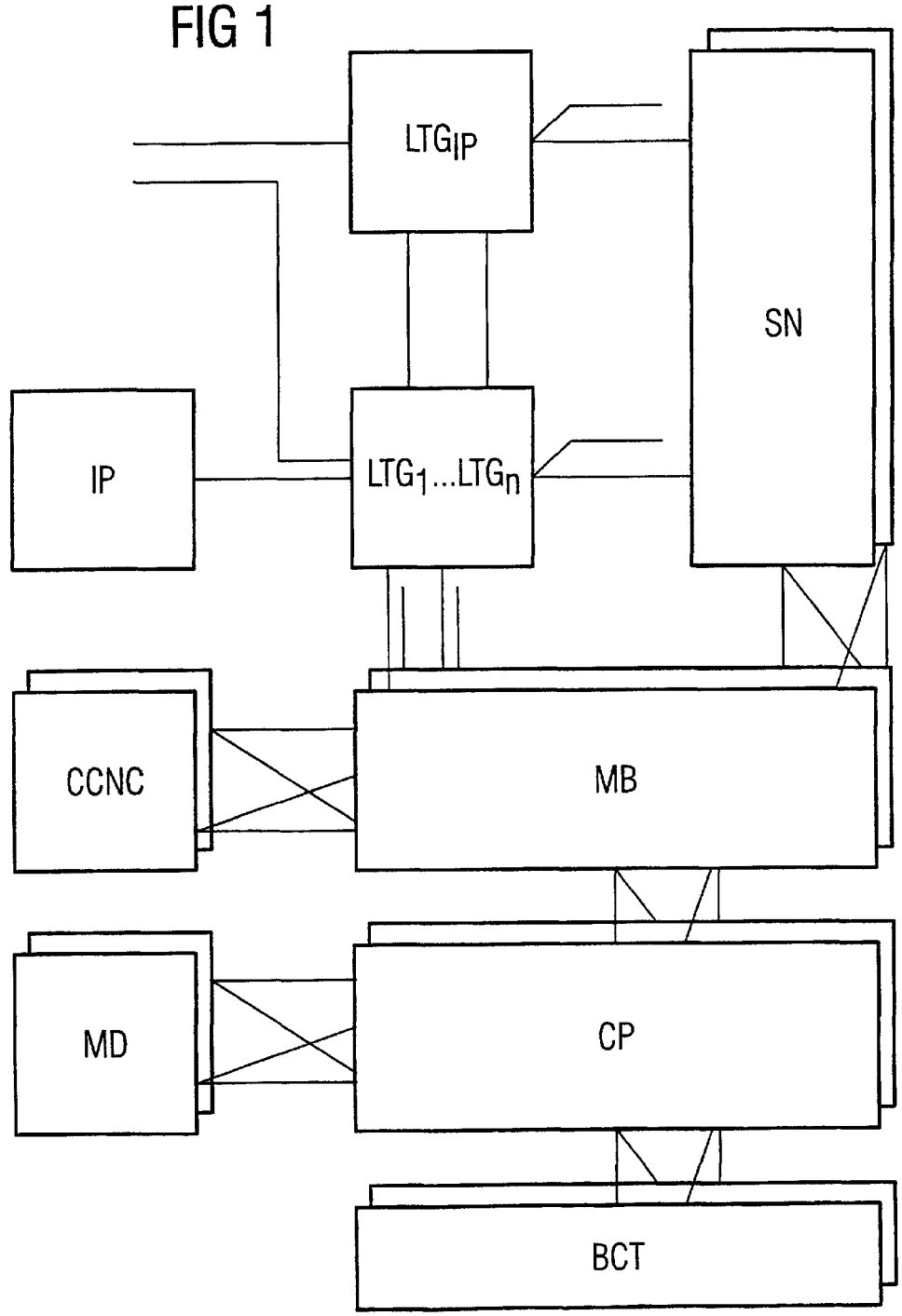
FIG. 1 shows an example architecture of a switching system with undoubted peripheral connection units.

FIG. 1 shows the typical architecture of a communications system structured with undoubted peripheral devices. Such a communications system consists of peripheral devices $LTG_1 \ldots LTG_n$ (connection devices for subscribers or lines), a central computer platform CP, a message distribution device MB and other central units (coupling field SN, protocol termination devices CCNC (e.g., #7), background memory MD, operating devices BCT).

The peripheral devices $LTG_1 \ldots LTG_n$ fulfill essential switching technology tasks connected with the voice channels of the peripheral device. Therefore the devices include switching technology programs, operating technology and administrative programs as well as data relating to the device, such as connection location, signaling, authorizations, telephone numbers, individual characteristics of connection lines and subscriber connections, as well as the expansion state and configuration of the peripheral device. In some of the peripheral devices $LTG_{IP}$, IP devices can be integrated as part of an integrated solution that provides announcement and dialog functions.

The central computer platform CP coordinates control of establishing and ending a connection, as well as for reactions to administrative and error-related changes in configuration. The peripheral devices $LTG_1 \ldots LTG_n$ are connected with one another and with the common computer platform CP by way of the message distribution system MB. The other central system components make special functions available to the switching system, for example for connecting the voice channels, processing the signal protocols, implementing the operator interface or storing mass data.

Figure 2:
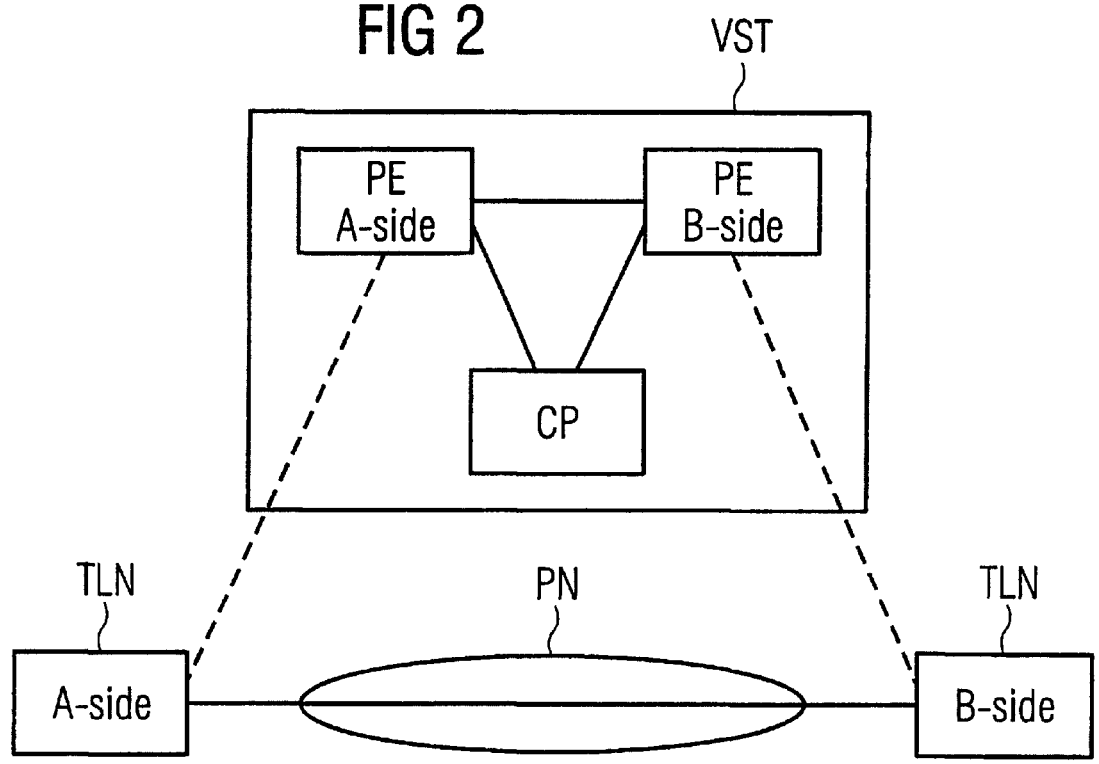
FIG. 2 shows separate paths of voice and signaling between two subscribers A and B.

FIG. 2 shows how voice is connected between the A subscriber (A side) and any B subscriber (B side). The terminals TLN can be structured as subscriber terminals or as trunk devices. The signaling messages proceeding from the terminals TLN are fed to the assigned switching center VST by the terminals TLN in question, and further processed there. Switching voice through takes place by-passing the switching center VST via a packet network PN. Since more than one direction has to be made available for this, two different peripheral devices PE are generally always involved in establishing and ending the connection.

Figure 3:
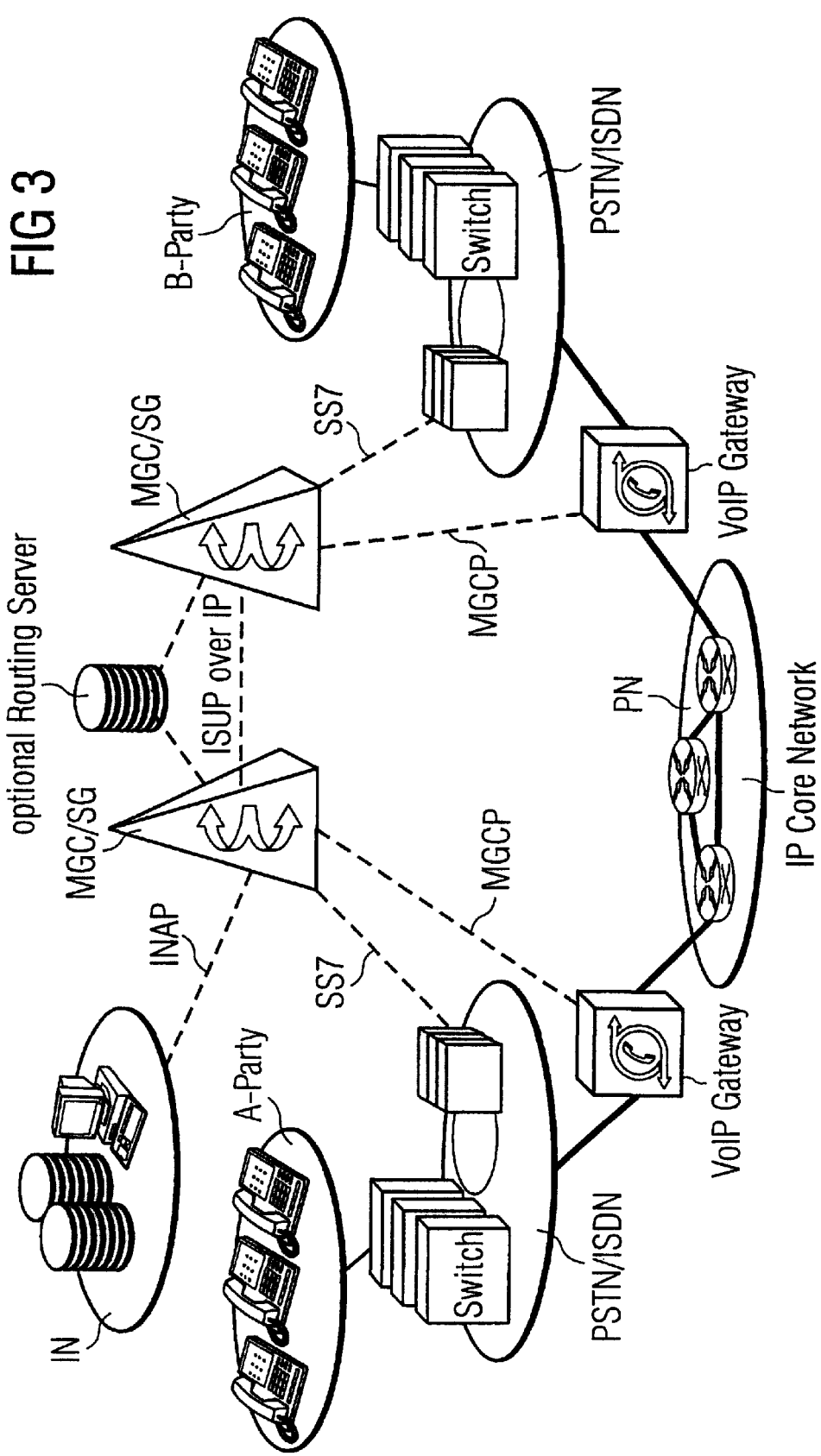
FIG. 3 shows a Voice over IP backbone scenario.

A network scenario in which switching centers are used for connections carried outside the switching center is shown in FIG. 3. Accordingly, the switching centers VST shown in FIG. 2 are arranged in the network as media gateway servers MGC/SG (MG Controller and Signaling Gateway). Here, it is further disclosed how the media gateway servers MGC/SG are integrated into the network. The data to be transmitted between these servers is switched through using standardized protocols MGCP, SS7, IP and RTP/RTCP.

According to the invention, analogous to the situation of a conventional TDM switching center with announcement and dialog ports, announcement lines able to be merged administratively to form groups of similar announcement/dialog lines are now defined in the switching center active for connections carried in the packet network PK, hereinafter referred to as a switching-center-based MGC/CPF (Media Gateway Controller and/or Call Feature Server).

Announcement capacities at IVR systems located in the packet network, with a direct packet-based interface for the working data including the announcements and end user input, are modeled as virtual announcement and/or dialog ports of the switching-center-based MGC/CFS. They are set up as in a conventional TDM switching center, but identification takes place administratively. This makes it evident that the resource is a virtual one; i.e., the port is located in a device outside the switching-center-based MGC/CFS and is controlled by the switching-center-based MGC/CFS through access to this device.

The IVR system that makes the announcement and dialog function available is set up in the switching-center-based MGC/CFS like a network transition to the TDM network, with the fact that announcement/dialog resources are available being input administratively, in the simplest case. In this way, the IVR system located in the packet network, which makes the announcement and dialog function available, is represented like a network transition in the switching-center-based MGC/CFS (hereinafter referred to as MG (Media Gateway)).

From the point of view of the switching-center-based MGC/CFS, there are media gateways with ports to the TDM network, media gateways with an announcement and/or dialog function, and media gateways that possess both ports to the TDM network and ports with an announcement and/or dialog function. In particular, a pure IVR system with announcement/dialog function represents itself to the switching-center-based media gateway server MGC/SG as a media gateway with a certain number of announcement/dialog ports.

The signaling protocol used by the switching-center-based MGC/CFS to control an MG is used to establish a connection to be carried in the packet network on packet-based announcements/dialogs. It is utilized in the same manner to end a connection carried in the packet network on packet-based announcements/dialogs. Control of the announcement/ dialog functionality takes place by introducing additional parameters into this protocol that describe the sequence of the announcement and dialog function. Such IVR parameters are, specifically, the number and/or the name of the announcement or dialog, the number of repetitions, the measures in case of error or if no input is provided by the end user, as well as individual parameters, as necessary, such as a changed telephone number. Examples of such signaling protocols are found in the INAP, MGCP, and H.248 standardization.

The peripheral devices are included in the switching-center-based MGC/CFS process virtual ports, which indicates the signaling, and therefore the feature processing, takes place in the switching-center-based MGC/CFS. The related working data flow is carried outside the switching-center-based MGC/CFS. The class of virtual announcement/dialog ports is now added to the virtual ports of the network transitions into the TDM network. These reappear as ports of a peripheral device for making announcement and dialog functions available. In contrast to the switching-center-integrated IVR systems in the case of TDM switching centers, however, this peripheral device does not possess any kind of dedicated hardware modules or firmware functions for processing the working data stream contained in the announcements and user input. In particular, there are no functions for deploying announcements on a voice channel or any recognition functions required for DTMF or voice recognition on the working channel. Therefore, announcement and dialog functions are provided by a peripheral device that acts as a peripheral device providing IVR functions, with no specific hardware/firmware functions.

This peripheral device with virtual announcement and/or dialog ports re-sets the B-side processing of calls to its ports by the switching-center-based MGC/CFS to busy signaling of the MG having IVR function assigned to the port. The orders for playing announcements and dialogs are issued by this peripheral device in the direction of the MG direction having IVR function. Return messages of the IVR system, for example indicating the end of an announcement or including the input of the end user, are sent to the assigned peripheral device with a virtual announcement and/or dialog port. Signaling between peripheral device handling the virtual announcement and/or dialog port and the assigned external IVR system takes place by way of the signaling protocol used for access to an MG.

If a feature or a service in the switching-center-based MGC/CFS requires an announcement or a dialog to be played, the selection of a suitable B-side virtual announcement and/or dialog port takes place by means of the switching-center-based MGC/CFS. The call is then connected to the port in the peripheral device assigned to the port, by means of the existing functionality of a switching center, and the order that describes the desired IVR function is signaled to the related peripheral device for switching technology processing of the announcement and/or dialog port. This makes it possible to use the services implemented in the conventional switching center with IVR portions again, since these do not have to be changed because they find the peripheral device with IVR function that is known to them in the stated peripheral device. The fact that in the final analysis the IVR function is made available by an external system, remains hidden to these software functions.

European patent application EP 99123208.3 (99P5338DE) discloses a method and a device for a virtual peripheral device. According to the invention, this virtual peripheral device can now be provided with virtual announcement and dialog ports, so that optimized utilization of the hardware basis of the switching-center-based MGC/CFS is achieved.

The number of virtual peripheral devices with IVR function that can run on one peripheral device is determined on the basis of the performance of the processors used on the peripheral device, the memory capacity, and the performance capacity of the message interface to the rest of the system.

If a plurality of IVR resources is made available and distributed to the network in the manner described above, the result achieved by using the existing functionality of the origination-dependent routing of a switching center is that announcements and dialogs are made available such that the network load is minimized. Therefore, a connection brought about by way of a media gateway, which connection requires an IVR function, is preferably satisfied by means of IVR resources in this gateway or in the vicinity of the media gateway.

Assignment of the peripheral device with virtual IVR ports or a virtual peripheral device for controlling IVR ports and an external IVR system is flexible. Depending on the performance data, a plurality of virtual peripheral devices having IVR function can be assigned to an external IVR system or, vice versa, a plurality of external IVR systems can be assigned to a single virtual peripheral device with IVR functionality.

However, a virtual peripheral device for controlling IVR ports is in principle able to control IVR resources in various external IVR systems. Vice versa, an external IVR system is able to process parallel orders for a plurality of virtual peripheral devices with IVR ports.

The failure or partial failure, or the renewed availability of external IVR resources, results in the temporary non-availability of individual virtual announcement and/or dialog ports or to their renewed availability by means of the back-up technology processes defined for ports at the media gateway. A total failure of the IVR system is tolerated because of network redundancy; i.e., the availability of the failed functions in virtual announcement and/or dialog ports on other external IVR systems.

Figure 4:
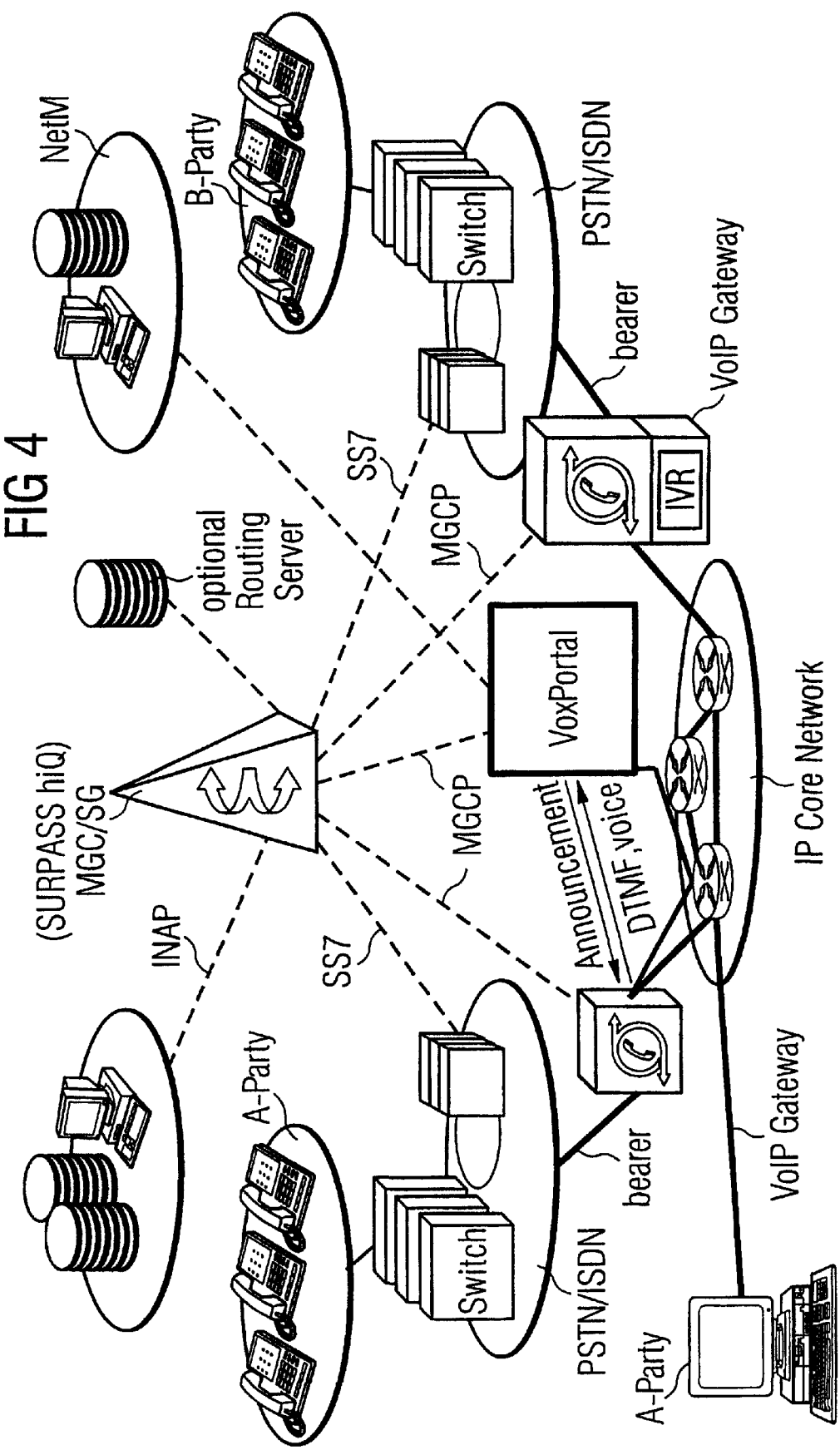
FIG. 4 shows a partially centralized and MG-integrated IVR system.

FIG. 4 shows a configuration in which the method according to the invention is carried out. Accordingly, switching-center-based MGCs/CFSs that can communicate with one another are provided. Communication with the media gateway takes place via the MGCP protocol, for example. Both IP-based and ATM-based packet networks are supported in this manner. The H.323 protocol, for example, is used for subscriber signaling. PCM-based trunks at the media gateway are processed by means of virtual ports of peripheral devices or virtual peripheral devices.

IP-base IVR resources available outside the switching-center-based MGC/CFS are modeled as virtual announcement and dialog ports at a media gateway of a new type. This new type of gateway possesses two forms:

If it exclusively makes IVR resources available, this is an IVR system that can be used universally, and possesses the task of making the IVR function available. If ports for the network transition TDM <-> IP are made available in addition to the IVR resource, this is an MG-integrated IVR resource that specifically makes simple IVR functions available (e.g., standard announcements in the form of recorded announcements). Both devices are controlled by means of the MGCP protocol by an IP-based switching center hiQ active for connections carried outside the switching center.

If an announcement or dialog function is supposed to be utilized in one of the gateways described above, an announcement/dialog port is occupied on the B side. The type of IVR function is then reported to the external IVR system by means of additional MGCP signaling. The IP-based switching center hiQ does not differentiate with regard to the treatment of the two MG types for IVR functions.

In order to transmit the parameters known from the H.248 protocol and also required for IVR performance features internal to the IP-based switching center hiQ, an expansion of the MGCP protocol to include parameters from the H.248 protocol is carried out. In the future, a pure H.248 interface will also be used between the IP-based switching center hiQ active for connections carried outside the switching center and the media gateways with IVR function.

In view of the negligible effort and expense for changes, and the optimized hardware costs of the IP-based switching center hiQ that is active for connections carried outside the switching center, control of the virtual announcement/dialog ports preferably takes place on the basis of virtual peripheral devices LTG with announcement and dialog function.

In this way, the internal hiQ interface between the functions that request the IVR function in other peripheral devices or in the coordination processor CP remains unchanged, significantly reducing development effort and expense.

In this application, the peripheral device for control of the IVR function, now a virtual one, essentially has the function of transmitting the return messages of the IVR system. The control of the IVR-specific hardware modules of the peripheral device with IVR function, at a comparatively low logical level, which is present in conventional use, is here eliminated.

The partially centralized IVR system (e.g., VoxPortal) acts like a media gateway with regard to control by the IP-based switching center hiQ. Partial or total failures of the partially centralized IVR system are imaged as temporary non-availability of virtual announcement and dialog ports, which then can no longer be used by the -IP-based switching center hiQ active for connections carried outside the switching center. Non-availability of IVR functionality in the MG-integrated IVR also results in a temporary call block of announcement and dialog ports in hiQ by means of MGCP signaling.

Figure 5:
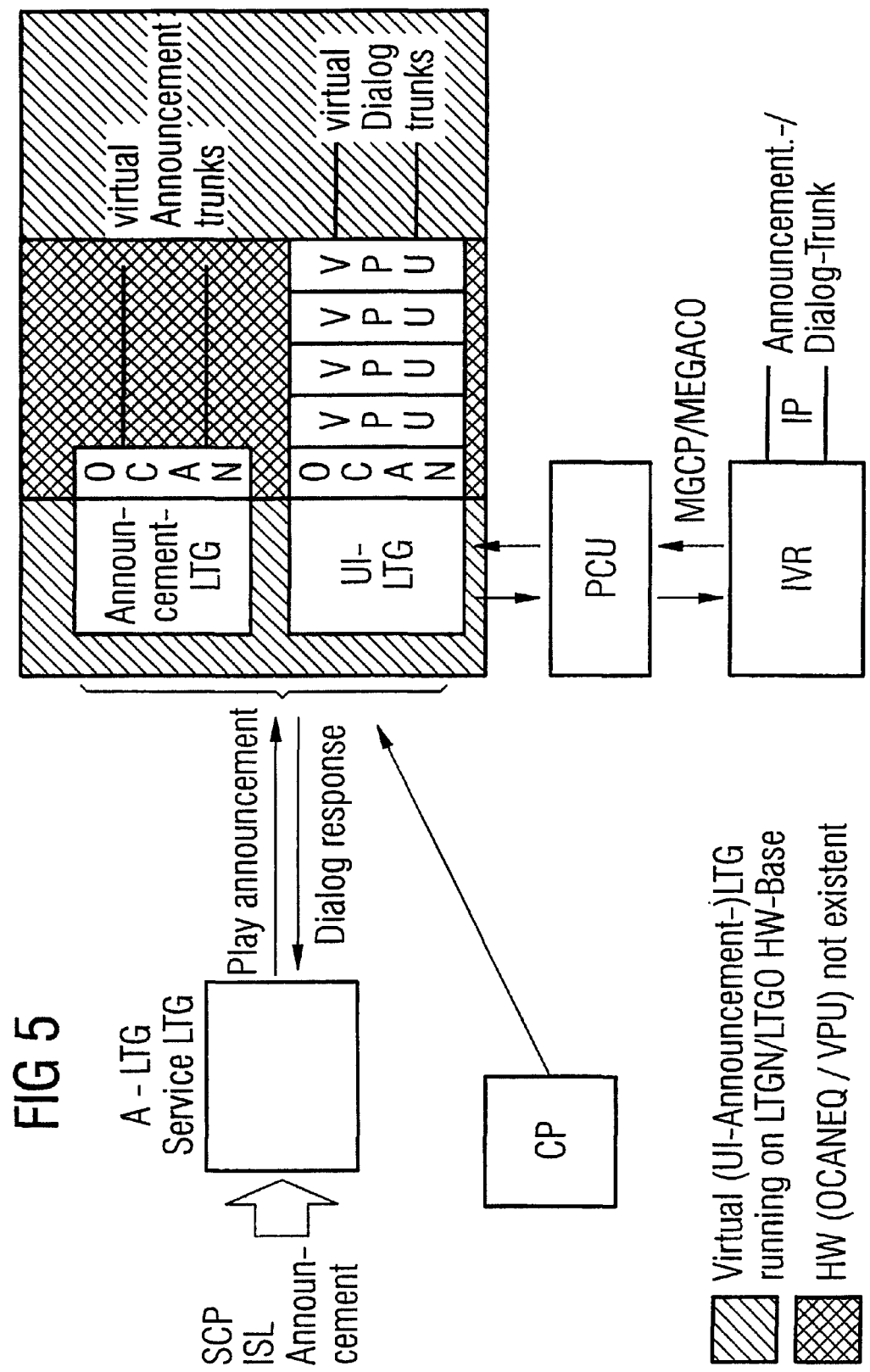
FIG. 5 shows the structure of the virtual IVR system.

FIG. 5 shows the structure of the virtual announcement and dialog system in greater detail. The peripheral device A-LTG, which is busy on the A side, or a service LTG (in other words, another peripheral device assigned neither to the A side nor the B side), or the central processor CP gives the order. The ports are structured as virtual ports.

What is claimed is:

1. A method for controlling announcements and dialogs for connections carried outside a switching center via a packet network, by peripheral devices of a switching system, comprising:
   providing resources for the announcement and dialog by an external device, which is located in the packet network;
   providing the peripheral devices with virtual announcement and dialog ports, where the peripheral devices are included in the switching center, a control interface exists between the peripheral devices and the external device, and external devices can be utilized in a port-specific manner by the switching system; and
   imaging failures or renewed availability of announcement and dialog resources as a temporary block of virtual announcement and dialog ports on peripheral devices with announcement/dialog functions.

2. The method according to claim 1, wherein the operating system and the back-up technology of the peripheral device with virtual ports allow quasi-parallel processing of n virtual peripheral devices, whereby each virtual peripheral device can be addressed by a respective logical address by way of the message interface of the physically assigned peripheral device.

3. The method according to claim 1, wherein packet-based transport of the working data stream for announcements and dialogs takes place in the direction of the packet network.

4. The method according to claim 1, wherein the internal interfaces to the peripheral device, with announcement and/or dialog function, are maintained.

5. The method according to claim 1, wherein administration internal to the switching system takes place as an announcement/dialog port on a network transition device.

6. The method according to claim 1, wherein control protocols for network transition devices are provided with announcement/dialog-specific elements.

7. The method according to claim 1, wherein origination-dependent routing is provided for selecting an announcement and/or dialog resource.

8. The method according to claim 1, wherein different IVR functionality at different external systems is taken into account by bundle formation of virtual ports having a same function.

9. The method according to claim 1, wherein the announcement and dialog resources can be used in undoubted and doubled peripheral devices.

10. The method according to claim 1, wherein standard announcements, individualized announcements and dialogs are supported by DTMF, voice or dial impulse input.

11. The method according to claim 1, wherein the packet network is structured as an IP network.

12. The method according to claim 1, wherein the packet network is structured as an ATM network.

13. A system for controlling announcements and dialogs for connections carried outside a switching center via a packet network, by peripheral devices of a switching system, comprising:
   resources for the announcement and dialog by an external device, which is located in the packet network;
   virtual announcement and dialog ports provided to the peripheral devices, where the peripheral device are included in the switching center;
   a control interface between the peripheral devices and the external device, wherein external devices can be utilized in a port-specific manner by the switching system; and
   failures or renewed availability of announcement and dialog resources are imaged as a temporary block of virtual announcement and dialog ports on peripheral devices with announcement/dialog functions.

14. The method according to claim 1, wherein peripheral devices do not make any hardware-oriented tasks available for the peripherals assigned to them by switching technology, thereby defining peripheral devices with virtual ports.

* * * * *